United States Patent [19]

Johnson et al.

[11] 4,204,871

[45] May 27, 1980

[54] PRINTING INKS CONTAINING NUCLEATED ORGANIC PIGMENTS

[75] Inventors: Mark U. Johnson; Jules Rothmayer; Hugh M. Smith, all of Cincinnati, Ohio

[73] Assignee: Sun Chemical Corporation, New York, N.Y.

[21] Appl. No.: 26,586

[22] Filed: Apr. 4, 1979

Related U.S. Application Data

[60] Continuation-in-part of Ser. No. 893,454, Apr. 4, 1978, abandoned, which is a division of Ser. No. 805,079, Jun. 9, 1977, abandoned.

[51] Int. Cl.² .............................................. C09D 11/02
[52] U.S. Cl. ...................................... 106/20; 106/22; 106/23; 106/288 Q; 106/289; 106/308 B
[58] Field of Search ................. 106/20, 22, 23, 288 Q, 106/289, 308 B

[56] References Cited

U.S. PATENT DOCUMENTS

| | | | |
|---|---|---|---|
| 1,995,933 | 3/1935 | Lasna et al. | 106/289 |
| 2,249,314 | 7/1941 | Lang | 106/289 |
| 2,294,306 | 8/1942 | Lang | 106/289 |
| 2,502,254 | 3/1950 | Glassman | 106/289 |
| 2,691,595 | 10/1954 | Drautz | 106/22 |
| 2,838,994 | 6/1958 | Lebl et al. | 106/22 |
| 3,036,059 | 5/1962 | Ehrhard et al. | 106/22 |
| 3,555,004 | 1/1971 | Mueller et al. | 106/19 |
| 3,759,731 | 9/1973 | Kuhue et al. | 106/288 Q |

*Primary Examiner*—Morton Foelak
*Attorney, Agent, or Firm*—Cynthia Berlow

[57] ABSTRACT

Substitutes for inorganic pigments that are particularly suitable for use in printing inks comprise nucleated organic pigments prepared by reacting in aqueous solution primary aryl amines with at least one coupling component in the presence of a conditioned, highly dispersed inorganic material.

17 Claims, No Drawings

PRINTING INKS CONTAINING NUCLEATED ORGANIC PIGMENTS

This application is a continuation-in-part of application Ser. No. 893,454, filed Apr. 4, 1978 now abandoned, which is a division of application Ser. No. 805,079 now abandoned, filed June 9, 1977.

This invention relates to printing inks. More particularly it relates to printing inks wherein the pigment is a nucleated organic azo pigment.

Inorganic pigments have been used extensively in solvent inks and water-based fluid inks because of the storage stability of the inks. Such inks have the very low viscosity which is required for the high velocity press printing speeds currently employed. The inherent opacity and excellent gloss characteristics of these inks are also prime considerations for printing on both transparent and off-color opaque substrates.

Such inks, however, have the disadvantage of settling, that is, upon standing, the pigment separates from the ink vehicle. Furthermore, recent environmental pressures have focused attention on the possibility of health hazards associated with the use of hexavalent chromium and lead-based systems. It is, therefore, important to find pigments that can replace lead chromate-based materials without losing the desirable ink printing characteristics, while at the same time overcoming the problem of settling without losing opacity and viscosity stability.

Conventional pigments of the azo type have been used to some extent, but inks containing them exhibit poor aging stability, high viscosities, and lack of opacity, making these pigments poor substitutes for lead chromate pigments. Inks made from conventional monarylide and diarylide yellow types of pigments, for example, exhibit very high viscosities which increase upon aging, often with thixotropic body, necessitating the addition of diluting solvents which, although correcting the viscosity, produces excessive weakness of printability and excessive transparency.

The use of inorganic substrates to extend organic pigments and to modify the rheology of ink systems is known, as disclosed in, for example, U.S. Pat. Nos. 1,995,933, 2,249,314, 2,294,306 and 2,502,254; however, when these pigments were tested in the fluid inks for which chrome yellow pigments are highly suitable, they were found not to confer sufficient viscosity stability to the finished ink and generally to have such a high viscosity that an excessive quantity of cut-back solvents was required, resulting in considerable loss of print strength and opacity. Other pigments, when prepared on a suitable substrate such as titanium dioxide and offered as chrome yellow substitutes, also were found unsuitable in fluid ink systems because they resulted in poor viscosity stability.

A process has now been found for the preparation of novel azo pigments that impart to inks improved rheology characteristics and opacity without settling, making these pigments suitable alternates for lead chromate in solvent inks and water-based fluid inks. These novel organic azo pigments are prepared by reacting in aqueous solution primary aryl amines with at least one coupling component in the presence of a highly dispersed inorganic material, such as for example iron oxide, titanium dioxide, barium sulfate, aluminum hydroxide, clays, and the like, and mixtures thereof, to form an intimate bond between it and the organic pigment.

The organic colorants of this invention are close to chrome yellow pigments in hue, gloss, viscosity, and stability of ink viscosity in the entire range from primrose chrome yellow (the rhombic-type crystal form) to the medium chrome yellow (the monoclinic crystal form) and may be directly substituted for the inorganic pigments in ink formulations.

In general the inorganic substrate is dispersed thoroughly in an aqueous medium by (a) mechanical means, e.g., high-speed dispersing equipment, (b) dispersing agents, or (c) chemical precipitation, as in the case of compounds such as barium sulfate. The dispersion contains about 5 to 95, and preferably about 30 to 75, percent of the substrate, based on the weight of the final pigment formulation.

At least one coupling component is then dissolved into the dispersion, and the product is reacted with the diazotized or tetrazotized mono- or diarylamines to form pigments which nucleate the substrate.

The reaction generally takes place within the temperature range of about $-3°$ to $100°$, and preferably between about $0°$ and $50°$ C.

In the preparation of printing inks it is essential that the rheology be carefully controlled.

Suitable compounds for this purpose are amines having the general formula

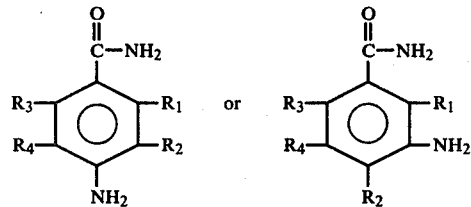

where $R_1$, $R_2$, $R_3$, and $R_4$ may be the same or different and each may be H, $CH_3$, $OCH_3$, and the like; at least one such compound is a required component of the pigment products of this invention. Examples of these amines include, but are not limited to 4-aminobenzamide, 4-methyl-3-aminobenzamide, and 4-methoxy-3-aminobenzamide. In general the amount of this component is about 2 to 70, and preferably about 5 to 15, percent, based on the total weight of the amines.

In addition, another primary aryl amine must be used, suitable materials including, but not being limited to, 3,3'-dichlorbenzidine, 4-nitro-1-amino-2-methoxybenzene, 1-amino-2-nitro-4-chlorbenzene, 1-amino-2-nitro-4-methylbenzene, 1-amino-2-nitro-4-methoxybenzene, 4-chloraniline, 2-chloraniline, and the like, and their mixtures.

For substitution of medium-shade yellow inorganic pigments, the preferred amine is 3,3'-dichlorbenzidine. To replace the primrose shade of chrome yellow, the preferred amine is 4-nitro-1-amino-2-methoxybenzene.

Suitable coupling agents include, but are not limited to acetoacetarylides, such as acetoacetanilide, acetoacet-o-toluidide, acetoacet-p-toluidide, acetoacet-p-phenetidide, acetoacetbenzylamide, acetoacet-m-xylidide, acetoacet-o-anisidide, acetoacet-p-chloranilide, and the like; 1-tolyl-3-methyl-5-pyrazolone or 1-phenyl-3-methyl-5-pyrazolone where the phenyl or tolyl group may contain one or more substituting groups such as for example alkyl, alkoxy, carboxy, carboxy-benzylamide, halo, nitro, or sulfo groups, and the pyrazolone group may contain a carboxy or carbethoxy group; and the like, and their mixtures. In each of these, the alkyl group has about 1 to 5 carbon atoms and the alkoxy group has about 1 to 5 carbon atoms.

The substrate may be any suitable inorganic material that is dispersible and insoluble in water and inert to the solvents and vehicles used in fluid inks, such as for example barium sulfate, aluminum hydroxide, zinc oxide, iron oxide, titanium dioxide, titanium dioxides modified with antimony or nickel (known as yellow and golden titanates), titanium dioxide modified with aluminum silicate, and clay, and the like, and their mixtures, with titanium dioxide and barium sulfate being preferred.

Opacity, viscosity, and hue can be controlled by the proper selection and formulation of substrates and pigments in order to match the range of shades of lead chromate pigments, such as primrose, lemon, light and medium chrome yellows, and the like, that heretofore was not possible with organic azo pigments.

The product can be recovered and further conditioned by any known and convenient technique. For example, it can be filtered, washed salt-free, and dried at about 60° to 85° C., or the slurry can be heated, filtered, and then dried.

The dried product can be further conditioned by heating it at about 110° to 250°, and preferably at about 120° to 160° C., for about 2 to 20, and preferably for about 3 to 7, hours. This treatment further enhances the opacity and lowers the viscosity of fluid inks formulated with the nucleated pigments of this invention.

The invention is illustrated by the following examples in which all parts and percentages are by weight unless otherwise specified.

EXAMPLE 1

(A) 24.3 Parts of 20 degrees Baumé hydrochloric acid was slurried with 11.4 parts of 3,3'-dichlorbenzidine and 1.33 parts of 4-aminobenzamide in 210 parts of water. The mixture was iced to 0° C. and reacted with 7.3 parts of sodium nitrite to form a solution of the tetrazonium salt of 3,3'-dichlorbenzidine and the diazonium salt of 4-aminobenzamide.

(B) A coupling solution was prepared by dispersing 98 parts of a highly-dispersible titanium dioxide in 600 parts of water. The slurry was adjusted to 800 parts at 10° C. with ice and water. A solution of 14.56 parts of acetic acid and 9.3 parts of sodium acetate was added, and into this mixture was added a solution of 5.5 parts of sodium hydroxide, 19.5 parts of acetoacet-o-toluidide, and 1 part of 1-phenyl-3-methyl-5-pyrazolone in 100 parts of water.

(C) To the slurry of part (B) the solution of part (A) was added uniformly over a period of 60 minutes and stirred further for 30 minutes.

(D) The product was filtered, washed, dried at 85° C., and ground to yield 130 parts of a bright yellow pigment. When tested in fluid inks, this pigment was comparable to medium-shade chrome yellow pigment in shade, gloss, and opacity. The viscosity of the ink was stable and there was very little settling.

EXAMPLE 2

(A) 24.3 Parts of 20 degrees Baumé hydrochloric acid was slurried with 15.2 parts of 4-nitro-1-amino-2-methoxybenzene and 1.33 parts of 4-aminobenzamide in 210 parts of water. The mixture was iced to 0° C. and reacted with 7.3 parts of sodium nitrite to form a solution of the diazonium salt of 4-nitro-2-amino-1-methylbenzene and the diazonium salt of 4-aminobenzamide.

(B) A coupling solution was prepared by dispersing 98 parts of a highly-dispersible titanium dioxide in 600 parts of water. The slurry was adjusted to 800 parts at 50° C. with ice and water. A solution of 14.56 parts of acetic acid and 9.3 parts of sodium acetate was added, and into this mixture was added a solution of 5.5 parts of sodium hydroxide, 21.2 parts of acetoacet-o-anisidide, and 1 part of 1-phenyl-3-methyl-5-pyrazolone in 100 parts of water.

(C) To the slurry of part (B) the solution of part (A) was added uniformly over a period of 60 minutes and stirred further for 30 minutes.

(D) The product was filtered, washed, dried at 85° C., and ground to yield 130 parts of a bright yellow pigment. When tested in fluid inks, this pigment was comparable to primrose-shade chrome yellow pigment in shade, gloss, and opacity. The viscosity of the ink was stable and there was very little settling.

EXAMPLE 3

The products of Examples 1 and 2 were further conditioned after drying by heating them for 6 hours at 135° C. The products were more opaque, lower in viscosity, and had a more stable viscosity when tested in fluid inks than did the pigments of Examples 1 and 2.

EXAMPLE 4

The procedures of Examples 1 and 2 were repeated with each of the following instead of 4-aminobenzamide: 4-methyl-3-aminobenzamide and 4-methoxy-3-aminobenzamide. The results were comparable.

EXAMPLE 5

The procedure of Example 1 was repeated with each of the following amines instead of 3,3'-chlorbenzidine: para-chloraniline, 1-amino-2-nitro-4-chlorbenzene, 1-amino-2-nitro-4-methylbenzene, and 1-amino-2-nitro-4-methoxybenzene. The results were comparable.

EXAMPLE 6

The procedure of Example 1 was repeated with each of the following coupling agents instead of acetoacet-o-toluidide and 1-phenyl-3-methyl-5-pyrazolone:
(a) 19.09 parts of acetoacetanilide
(b) 20.59 parts of acetoacet-o-toluidide
(c) 20.6 parts of acetoacet-p-toluidide
(d) 20.9 parts of acetoacet-m-xylidide
(e) 29.28 parts of acetoacet-2,5-methoxy-4-chloranilide
(f) 18.07 parts of acetoacetanilide mixed with 1.0 part of 1-phenyl-3-methyl-5-pyrazolone
(g) 18.67 parts of acetoacet-o-toluidide mixed with 2.1 parts of 1-phenyl-3-carbethoxy-5-pyrazolone
(h) 23.87 parts of acetoacet-p-phenetidide
(i) 21.62 parts of acetoacetbenzylamide
(j) 23.70 parts of 2,5-dimethoxyanilide
(k) 22.81 parts of acetoacet-p-chloranilide
(l) 23.70 parts of 2,4-dimethoxyanilide The products were comparable in viscosity and stability of viscosity when tested in fluid inks.

EXAMPLE 7

The procedures of Examples 1 through 6 were repeated with each of the following instead of titanium dioxide: yellow iron oxide, precipitated barium sulfate, aluminum hydroxide, golden titanates, yellow titanates, titanium dioxide modified with aluminium silicate, zinc oxide, and clay.

The products were comparable in viscosity and stability of viscosity when tested in fluid inks.

EXAMPLE 8

The procedures of Examples 1 and 2 were repeated except that the pigment products were filtered and washed as in part (D) after heating. The products were comparable to chrome yellow pigments when tested in solvent inks.

EXAMPLE 9

The procedures of Examples 7 and 8 were repeated except that the products were further conditioned after drying by heating them for 6 hours at 135° C. The products were more opaque and lower in viscosity than the products of Examples 7 and 8 when tested in solvent inks.

EXAMPLE 10

Each of the nucleated pigment products of Examples 1 through 9 was formulated into a solvent ink containing the following ingredients:

(A) For the lighter green hues:

|  | Parts |
| --- | --- |
| nucleated pigment product | 20.00 |
| polyamide resin | 24.93 |
| nitrocellulose | 3.20 |
| solvent (mixture of toluol, heptane, and n-propanol/n-propyl acetate) | 51.87 |

(B) The properties of the inks of part (A) were compared with those of a conventional ink containing the following ingredients:

|  | Parts |
| --- | --- |
| chrome yellow pigment (primrose) | 40.0 |
| polyamide resin | 18.7 |
| nitrocellulose | 2.4 |
| solvent mixture | 38.9 |

(C) For the darker redder hues:

|  | Parts |
| --- | --- |
| nucleated pigment product | 40.0 |
| polyamide resin | 18.7 |
| nitrocellulose | 2.4 |
| solvent mixture | 38.9 |

(D) The properties of the ink of part (C) were compared with those of a conventional ink containing the following ingredients:

|  | Parts |
| --- | --- |
| chrome yellow pigment (medium) | 40.0 |
| polyamide resin | 18.7 |
| nitrocellulose | 2.4 |
| solvent mixture | 38.9 |

All of the inks were adjusted by the addition of solvent to a print viscosity of 20 seconds on a Zahn #2 viscosity cup.

The gloss, opacity, and viscosity of the inks of parts (A) and (B) were similar as were the gloss, opacity, and viscosity of the inks of parts (C) and (D); the hue could be controlled by the selection of the azo toners. Stability tests were carried out by aging the inks and retesting with the Zahn viscosimeter after one and two weeks. Stability was considered satisfactory when little or no increase in viscosity occurred. In general an increase in viscosity of 20% was the limiting factor and an increase of not more than 10% was preferred.

The inks of parts (A) and (C) showed very little separation or settling, whereas the inks of parts (B) and (D) showed some settling.

EXAMPLE 11

The procedures of Example 10 (A) and (C) were repeated except that the nucleated pigment products were replaced by a conventional dry azo pigment mixed with the same substrate at the same ratio of pigment to substrate as in the products of Examples 1 through 9.

The quality of the nucleated pigments of Example 10 (A) and (C) was not matched. Although the ink products were similar in shade, the gloss of the products of this example was lower and the settling and separation were greater than of the inks containing the nucleated products.

EXAMPLE 12

(A) Each of the nucleated pigment products of Examples 1 through 9 was formulated into a water-based fluid ink containing the following ingredients:

|  | Parts |
| --- | --- |
| nucleated pigment product | 70.00 |
| acrylic resin | 36.75 |
| aqueous ammonia | 54.05 |
| isopropanol | 14.20 |

The ingredients were ground in a ball mill for 16 hours, at which time the dispersion was complete. The inks were adjusted by the addition of water to a print viscosity of 22 seconds on a Zahn #2 viscosity cup.

(B) The properties of the inks of part (A) were compared with those of conventional inks containing chrome yellow pigments. The products were equal in strength, opacity, and gloss; the hue was controlled by the selection of the azo toner. Very little separation and settling of the nucleated pigment products occurred in the inks of part (A), whereas some settling occurred in the inks made with the chrome yellow pigments.

EXAMPLE 13

The procedure of Example 12 (A) was repeated except that the nucleated pigment products were replaced by a conventional dry azo pigment mixed with the same substrate at the same ratio of pigment to substrate as in the products of Examples 1 through 9.

The quality of the nucleated pigments of Example 12 (A) was not matched. Although the ink products were similar in shade, the inks of this example were weaker, flatter, chalkier, and settled and separated more than did those inks containing the nucleated pigment products.

By the process of this invention were obtained fluid inks having rheology heretofore obtainable only with inorganic pigments. The novel nucleated azo pigments of this invention do not have the thixotropic body usually associated with organic pigments; they have superior dispersibility; and the inks prepared from these pigments have viscosities that are stable upon aging.

Furthermore, the superior gloss and the controlled opacity of the resultant fluid inks permit their use in a variety of printing systems that are not suitable for use with fluid inks formulated with conventional pigments.

What is claimed is:

1. A printing ink wherein the pigment is a nucleated azo pigment prepared by reacting in aqueous solution (a) a compound having the formula

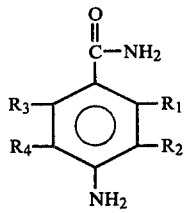 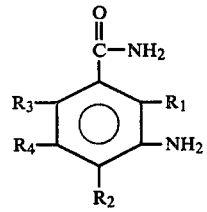

wherein $R_1$, $R_2$, $R_3$, and $R_4$ may be the same or different and each may be H, $CH_3$, or $OCH_3$, (b) at least one other primary aryl amine, and (c) at least one coupling agent in the presence of (d) a dispersed inorganic material.

2. The printing ink of claim 1 wherein compound (a) is 4-aminobenzamide.

3. The printing ink of claim 1 wherein the amount of compound (a) is about 2 to 70 percent, based on the total weight of (a) and (b).

4. The printing ink of claim 1 wherein the amount of compound (a) is about 5 to 15 percent, based on the total weight of (a) and (b).

5. The printing ink of claim 1 wherein said amine (b) is 3,3'-dichlorbenzidine.

6. The printing ink of claim 1 wherein said amine (b) is 4-nitro-1-amino-2-methoxybenzene.

7. The printing ink of claim 1 wherein the coupling agent (c) is an acetoacetarylide; 1-tolyl-3-methyl-5-pyrazolone; 1-phenyl-3-methyl-5-pyrazolone; substituted 1-tolyl-3-methyl-5-pyrazolone or 1-phenyl-3-methyl-5-pyrazolone where the phenyl or tolyl group contains one or more alkyl, alkoxy, carboxy, carboxybenzylamide, halo, nitro, or sulfo group, and the pyrazolone group contains a carboxy or carbethoxy group; or a mixture thereof.

8. The printing ink of claim 1 wherein the inorganic material (d) is titanium dioxide, titanium dioxide modified with antimony or nickel, titanium dioxide modified with aluminum silicate, zinc oxide, iron oxide, aluminum hydroxide, barium sulfate, clay, or a mixture thereof.

9. The printing ink of claim 1 where the pigment is conditioned by heating it at a temperature within the range of about 110° to 250° C.

10. The printing ink of claim 1 wherein the amines are 4-aminobenzamide and 3,3'-dichlorbenzidine, the coupling agents are acetoacet-o-toluidide and 1-phenyl-3-methyl-5-pyrazolone, and the inorganic material is a highly dispersible titanium dioxide.

11. The printing ink of claim 1 wherein the amines are 4-aminobenzamide and 4-nitro-1-amino-2-methoxybenzene, the coupling agent is acetoacet-o-anisidide, and the inorganic material is a highly dispersible titanium dioxide.

12. A pigment prepared by reacting in aqueous solution (a) a compound having the formula

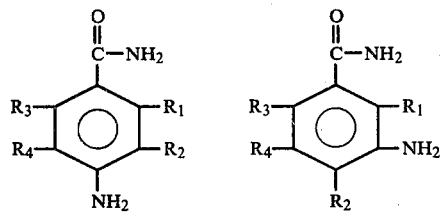

wherein $R_1$, $R_2$, $R_3$, and $R_4$ may be the same or different and each may be H, $CH_3$, or $OCH_3$, (b) at least one other primary aryl amine, and (c) at least one coupling agent in the presence of (d) a dispersed inorganic material.

13. The pigment of claim 12 wherein compound (a) is 4-aminobenzamide.

14. The pigment of claim 12 wherein the amount of compound (a) is about 2 to 70 percent, based on the total weight of (a) and (b).

15. The pigment of claim 12 wherein the amount of compound (a) is about 5 to 15 percent, based on the total weight of (a) and (b).

16. The pigment of claim 12 wherein said amine (b) is 3,3'-dichlorbenzidine.

17. The pigment of claim 12 wherein said amine (b) is 4-nitro-1-amino-2-methoxybenzene.

* * * * *

UNITED STATES PATENT OFFICE
CERTIFICATE OF CORRECTION

PATENT NO. : 4,204,871
DATED : May 27, 1980
INVENTOR(S) : M. U. Johnson, J. Rothmayer, and H. M. Smith It is certified that error appears in the above-identified patent and that said Letters Patent are hereby corrected as shown below:

Column 7, line 15, insert --or-- between the two formulas

Column 8, line 25, insert --or-- between the two formulas

Signed and Sealed this

Twenty-ninth Day of July 1980

[SEAL]

Attest:

SIDNEY A. DIAMOND

Attesting Officer

Commissioner of Patents and Trademarks